May 23, 1961  H. E. HANCOCK  2,985,448
STAND FOR AUTOMOBILE ENGINES AND THE LIKE
Filed July 15, 1959  2 Sheets-Sheet 1
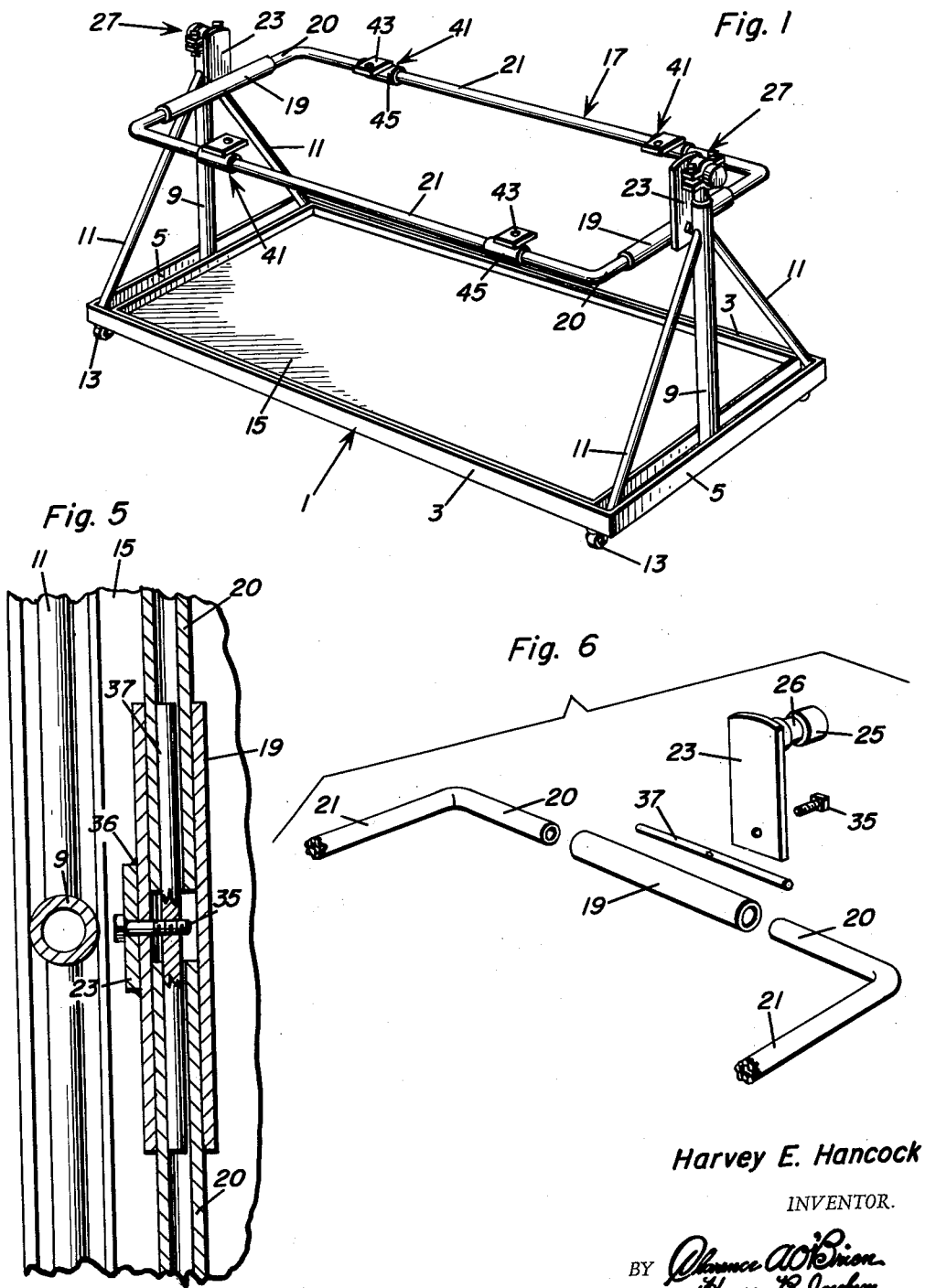
Harvey E. Hancock
INVENTOR.

May 23, 1961 H. E. HANCOCK 2,985,448
STAND FOR AUTOMOBILE ENGINES AND THE LIKE
Filed July 15, 1959 2 Sheets-Sheet 2
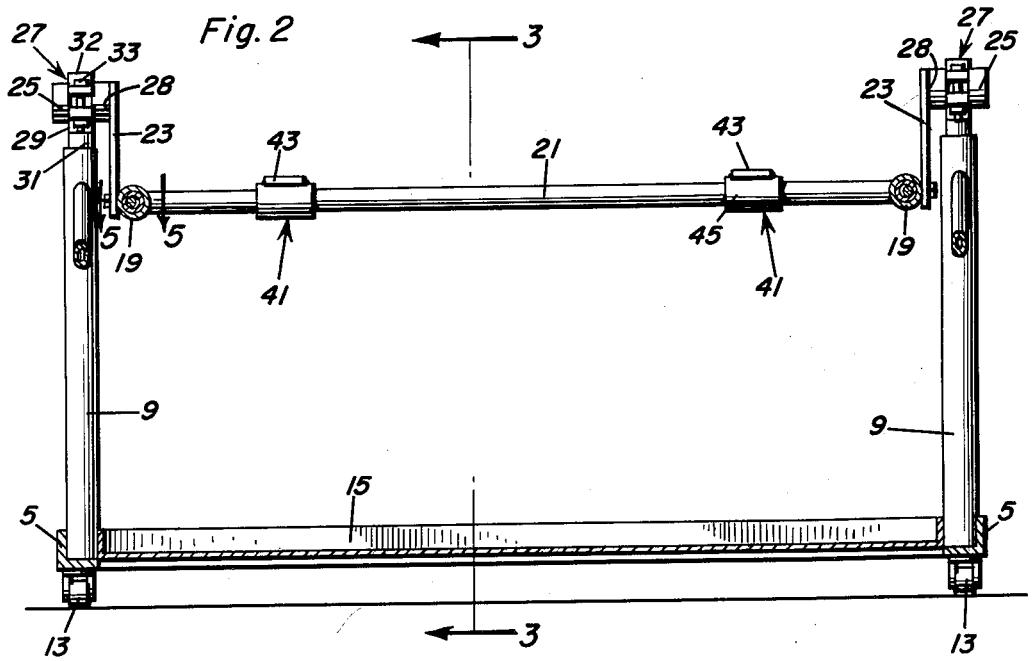
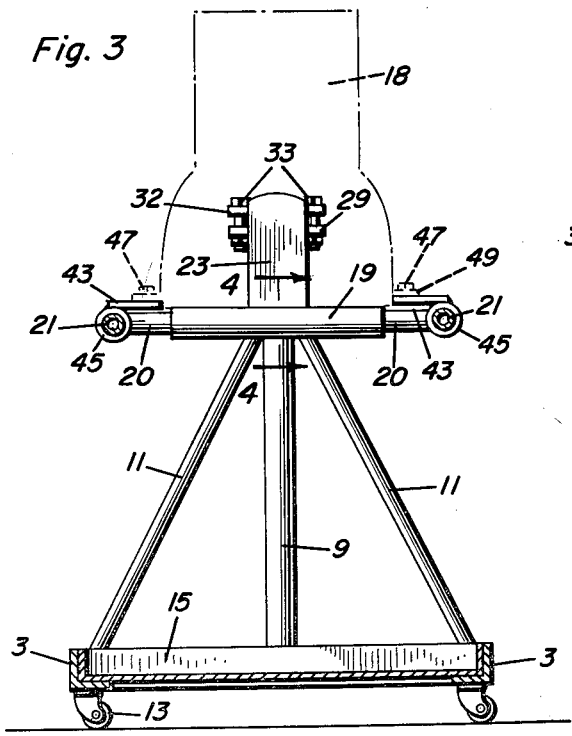
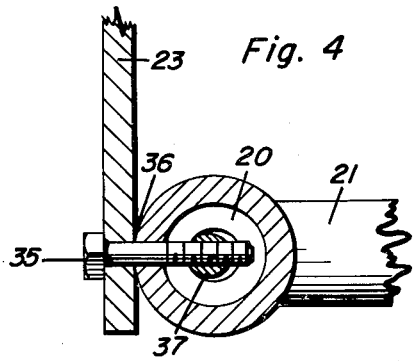
Harvey E. Hancock
INVENTOR.

United States Patent Office 2,985,448
Patented May 23, 1961

2,985,448

STAND FOR AUTOMOBILE ENGINES AND THE LIKE

Harvey E. Hancock, P.O. Box 142, Garberville, Calif.

Filed July 15, 1959, Ser. No. 827,334

8 Claims. (Cl. 269—191)

This invention relates to improvements in mobile stands for use in shops and garages to support automobile engines and automatic transmissions for repair or replacement of parts and like operations.

The principal object of the invention is to provide a stand for the above purposes which may be very inexpensively constructed to suspend an automobile engine, and/or automatic transmission either level or in laterally tilted positions and either right side up or in inverted position and whereby to facilitate working thereon by a mechanic.

Another object is to provide a stand for the above purposes which is equipped with adjustable means for supporting fast thereon engines of different widths and length and which is safe to use and not liable to get out of order.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a stand constructed in accordance with the invention;

Figure 2 is an enlarged view in vertical longitudinal section, partly in side elevation;

Figure 3 is a view in vertical cross-section taken on the line 3—3 of Figure 2 with an automobile engine supported on the stand and shown in broken lines;

Figure 4 is an enlarged fragmentary view in vertical section taken on the line 4—4 of Figure 3;

Figure 5 is an enlarged fragmentary view in horizontal section taken on the line 5—5 of Figure 2; and, Figure 6 is an exploded view in perspective of parts of the adjustable supporting means.

Referring to the drawings by numerals, the stand of this invention comprises an oblong, rectangular base frame designated generally by the numeral 1, and which comprises sides 3 and ends 5 formed of angle bars suitably secured together with channels facing upwardly.

At the ends 5 of the base frame 1 a pair of upright tubular posts 9 rise from and are suitably fixed to said ends 5. Pairs of diagonal brace rods 11 incline upwardly to opposite sides of the posts 9 from the corners of the base frame 1 and are fixed in any suitable manner to said posts 9 and said base frame 1.

Corner caster wheels 13 support the base frame 1 to render the stand mobile, and a rectangular drip pan 15 is removably fitted in said base frame 1 on the sides 3 of said base frame to catch oil and grease dropping from an engine or the like supported on the stand above said pan.

An oblong rectangular cradle frame 17 is provided between the upper ends of the posts 9 for supporting on the stand in suspended position a piece of work such as an automobile engine, shown in broken lines at 18 in Figure 3.

The cradle frame 17 comprises a pair of tubular end sleeves 19 transverse to the posts 9 and a pair of generally U-shaped, tubular side members or sections 21 having opposite right angled ends 20 turned inwardly of said cradle frame 17 and slidably adjustable in opposite ends of said sleeves 19, whereby the cradle frame is adjustable as to width.

Means for adjustably suspending the cradle frame 17 in underslung position for rotary adjustment about a horizontal axis is provided and comprises the following. A pair of hanger plates 23 at opposite ends of the cradle frame 17 are suspended by horizontal outwardly projecting trunnions 25 rotatable in a pair of journal bearings 27 surmounting the posts 9. The trunnions 25 are welded, as at 28, to the hanger plates 23.

The journal bearings 27 comprise pillow blocks 29 on vertical studs 31 suitably secured in the upper ends of the posts 9, and cap plates 32 bolted, as at 33, on said pillow blocks 29 for clamping the trunnions 25 between said pillow blocks 29 and said cap plates 32. The trunnions 25 are circumferentially grooved, as at 26, to receive the bearings 27 for preventing end thrust of said trunnions. A horizontal set bolt 35 extends through the lower end of each hanger plate 23 and into the transverse center of the adjacent sleeve 19 which is welded, as at 36, to the hanger plate 23.

The set bolts 35 form part of means for locking the side members 21 in adjusted position and hence the cradle frame 17 adjusted as to width. The remainder of this means comprises a pair of slide rods 37 loosely fitting in the spaced ends 20 of the side members 21 and through which the set bolts 35 are threaded between said ends 20. By tightening the set bolts 35 the slide rods 37 are clamped to the ends 20 and said ends 20 clamped to the sleeves 19 whereby to lock the cradle frame 17 in different adjusted positions for varying the width of said cradle frame.

A pair of adapter brackets 41 are provided on each side member 21 between its ends 20 for attaching to the cradle frame 17 an engine and/or an automatic transmission or like work. The brackets 41 comprise apertured plates 43 for bolting of an engine and/or transmission thereto and sleeves 45 on said plates slidable on the side members 21 longitudinally thereof so that the brackets 41 are slidably adjustable toward and from each other to provide for bolting thereto engines or like work of different lengths.

The use and operation of the described stand will be readily understood. An engine 18 is attached to the adapted brackets 41 by bolts 47 passing through the apertured plates 43 and through the usual flanges 49 on the engine 18. The cradle frame 17 may be adjusted to widths suitable for such attachment of the engine and the adapter brackets 45 adjusted along the side members 21 as may be required by the length of the engine. As will be understood, engines with or without automatic transmissions may be so attached to the cradle frame 17. The side members 21 may be differently adjusted to balance an attached engine on the cradle frame 17.

The cradle frame 17 and an attached engine with or without a transmission may be inverted if desired by inverting the cradle frame 17 in the bearings 27 and locking the trunnions 25 by tightening the cap plates 32 of the bearings 27 against said trunnions. Obviously, the cradle frame 17 may be tilted laterally about the axis of the trunnions 25 and locked in tilted position by tightening the bearing cap plates 32 against said trunnions so that an engine may be correspondingly tilted sidewise to facilitate working thereon. The drip pan catches grease and oil dropping from an engine attached on the cradle frame 17 and may be easily removed for emptying as desired.

The caster wheels 13 provide for easy pushing of the stand from place to place with or without work thereon.

The posts 9, braces 11, cradle frame 17 and trunnions 25 may be formed of suitable metal tubing such as steel pipe, the drip pan of sheet iron and the hanger plates 23 of cast iron. Also the base frame may be formed of angle iron bars. The bearings 27 may be formed of standard parts and the adapter brackets 41 of cast iron parts. Thus the stand may be constructed of very inexpensive parts.

The foregoing is considered as illustrative only of the principles of the invention. Further, since numerous modifications and changes will readily occur to those skilled in the art, it is not desired to limit the invention to the exact construction and operation shhown and described, and accordingly, all suitable modifications and equivalents may be resorted to, falling within the scope of the invention as claimed.

What is claimed as new is as follows:

1. A stand for supporting an automobile engine comprising a base frame having ends, a pair of posts rising from said ends of the frame, a rectangular oblong cradle frame between said posts comprising side members having inturned ends at opposite ends of the cradle frame, means at the ends of the cradle frame slidably connecting and supporting the ends of the side members for relative adjustment of said side members to vary the width of the cradle frame for supporting engines of different widths, means rotatably supporting said cradle frame by said first-named means from said posts in underslung position for rotation about a horizontal axis for tilting and inverting to tilt and invert an engine supported on the cradle frame, and adapters on said side members for attachment of an engine thereto and being slidably adjustable on said side members for attachment thereto of engines.

2. A stand according to claim 1, and a drip pan on said base frame below said cradle frame for catching drippings from an engine attached to said cradle frame.

3. A stand according to claim 1, said means at the ends of the cradle frame comprising a pair of sleeves in which the ends of the side members are slidably adjustably disposed, said means rotatably supporting the cradle frame comprising a pair of hanger plates secured to the sleeves, trunnions on said plates and bearings on said posts on which said trunnions are journaled.

4. A stand according to claim 1, said means at the ends of the cradle frame comprising a pair of sleeves in which the ends of the side members are slidably adjustably disposed, and means for retaining said ends in adjusted position comprising a rod in each sleeve, the ends of the side members disposed in the sleeve being hollow and said rod extending into said ends, and a bolt in the sleeve threaded through the rod for clamping the rod against said ends and said ends against the sleeve.

5. A stand according to claim 3, said bearings being adjustable for clampingly engaging said trunnions for retaining the cradle frame in different rotated positions.

6. An engine stand comprising a pair of supports, a pair of sleeves mounted on said supports, a frame comprising a pair of generally U-shaped tubular sections having their end portions engaged for sliding adjustment in the sleeves, means engaged in said end portions of said tubular sections and cooperable with said sleeves for frictionally securing the sections in adjusted position, and means for securing an engine on the frame.

7. An engine stand comprising a pair of supports, a pair of sleeves mounted on said supports, a frame comprising a pair of generally U-shaped tubular sections having their end portions engaged for sliding adjustment in the sleeves, means for securing the sections in adjusted position, and means for securing an engine on the frame, the first-named means including rods extending between said end portions of said sections and slidably engaged therein, and bolts rotatably mounted in the supports and threadedly connected to the rods for drawing said rods toward said supports for clamping said sections therebetween.

8. An engine stand comprising a pair of posts, a pair of plates mounted for swinging adjustment in a vertical plane on said posts, a pair of sleeves fixed on said plates, a frame including a pair of generally U-shaped tubular sections having their end portions engaged for sliding adjustment in the sleeves, rods in the sleeves slidably engaged in the sections, bolts rotatably mounted on the plates and threadedly connected to the rods for drawing same toward said plates for clamping the sections in adjusted position, means for securing the plates in adjusted position, and means for securing an engine on the frame.

References Cited in the file of this patent

UNITED STATES PATENTS

| | | |
|---|---|---|
| 1,164,395 | Reiselt | Dec. 14, 1915 |
| 1,486,481 | Cole | Mar. 11, 1924 |
| 1,834,294 | Spahn | Dec. 1, 1931 |
| 2,513,959 | Onsrud | July 4, 1950 |
| 2,568,508 | Montague | Sept. 18, 1951 |